United States Patent [19]
Delbare et al.

[11] Patent Number: 5,809,197
[45] Date of Patent: Sep. 15, 1998

[54] OPTICAL COUPLING STRUCTURE, METHOD OF REALIZING SUCH A STRUCTURE AND RELATED POSITIONING MEANS

[75] Inventors: Wim Jozef Robert Delbare, Beervelde; Jan Alfons Oda Maria Vandewege, Mariakerke-Gent; Peter Vetter, Antwerp; Francois Jeanne Charles Leyssens, Mortsel, all of Belgium

[73] Assignee: Alcatel N.V., Rijswijk, Netherlands

[21] Appl. No.: 443,115

[22] Filed: May 17, 1995

[30]     Foreign Application Priority Data

May 18, 1994 [EP]    European Pat. Off. ......... 94 201 401.0

[51] Int. Cl.[6] ...................................................... G02B 6/28
[52] U.S. Cl. ................................. 385/139; 385/76; 385/83
[58] Field of Search ................................. 385/139, 76, 83, 385/14, 17, 85

[56]         References Cited

U.S. PATENT DOCUMENTS

| | | | |
|---|---|---|---|
| 4,863,232 | 9/1989 | Kwa | 385/135 |
| 5,253,310 | 10/1993 | Delbare et al. | 385/14 |

FOREIGN PATENT DOCUMENTS

| | | |
|---|---|---|
| 0 530 875 | 3/1993 | European Pat. Off. . |
| 0 556 937 | 8/1993 | European Pat. Off. . |
| 85-00899 | 2/1985 | WIPO . |

*Primary Examiner*—Phan T. H. Palmer
*Attorney, Agent, or Firm*—Frishauf, Holtz, Goodman, Langer & Chick

[57]            ABSTRACT

A coupling structure couples an optical termination (T1/T5) of an optical fiber conductor (F1/F5) to an optical terminal (T1'/T5') of an optical device which can be another optical fiber conductor. The structure includes a carrier (S, P) wherein the optical fiber conductor is embedded therein to have at least one locally bent portion reaching an outer surface of the carrier and forming there the optical termination. The carrier includes a first positioning device (P) to correctly position the optical termination with respect to the carrier and a second positioning device (L1–L3) which cooperates with a third positioning device (s1, s2, s3) of an optical arrangement including the optical device to provide the coupling. The first positioning device (P) is a plate having a substantially V-shaped lateral cut-out portion wherein the optical termination (T1/T5) fits and the second and third positioning devices are upstanding tongue shaped elements and edges of cut-out parts of the carrier and of the optical arrangement.

14 Claims, 1 Drawing Sheet

OPTICAL COUPLING STRUCTURE, METHOD OF REALIZING SUCH A STRUCTURE AND RELATED POSITIONING MEANS

BACKGROUND OF THE INVENTION

1. Field of the Invention

The present invention relates to an optical coupling structure for coupling an optical termination of an optical fiber conductor to an optical terminal of an optical device, said optical coupling structure including a carrier wherein said optical fiber conductor is so embedded that it has at least one locally bent portion reaching an outer surface of said carrier and forming there said optical termination, said carrier including a first positioning means to correctly position said optical termination with respect to said carrier and a second positioning means able to cooperate with a third positioning means of an optical arrangement including said optical device to realize said coupling.

The optical device may be either an active electro-optical component such as a light emitting diode, a laser diode, an optical switch, a detector etc. or a group of such components, or a passive component such as another optical fiber conductor or a group of optical fiber conductors.

The second and third positioning means are so positioned that the above mentioned coupling is achieved by the cooperation of these positioning means.

2. Description of the Prior Art

An optical coupling structure of the above type is already known in the art, e.g. from the published European Patent Application No. 530 875 (Delbare 3). Therein, the first positioning means is realized by a groove in a substrate of the carrier wherein the optical fiber conductor is laid. As a result the groove has to be accurately realized over a length which corresponds to the length of the optical fiber conductor on the substrate. Moreover, since the length of the fiber conductor on the substrate is not always the same for different coupling structures, no volume production of the substrate with the groove is possible.

An object of the present invention is to provide an optical coupling structure of the above known type but without the above mentioned drawbacks, i.e. without an accurate groove having to be realized over the whole length of the optical fiber conductor on the substrate and with the possibility for volume production.

SUMMARY OF THE INVENTION

According to the invention, this object is achieved by providing said first positioning means which comprises a plate having a substantially V-shaped lateral cut-out portion wherein said optical termination fits.

In this way, only the cut out part, the length of which is considerably smaller than the length of the grooves of the known coupling structure, has to be realized accurately. It has to be dimensioned in such a way that it can support the optical termination of the optical fiber conductor. Moreover, as the optical terminations of most of the fiber conductors are similar, plates with the above mentioned cut-out parts can be produced in volume for different coupling structures.

Another characteristic feature of the present invention is that said optical arrangement includes a second carrier on which said optical device is mounted and whereon second and third positioning means are provided as upstanding tongue shaped elements and predetermined edges of said first and second carriers, said tongue shaped elements and said predetermined edges being so positioned that coupling can be realized by mutually bringing the lateral edges of said tongue shaped elements and respective ones of said predetermined edges to a predetermined relative position with respect to each other. More specifically said upstanding tongue shaped elements are rectangular and said predetermined edges are edges of rectangular cut-out parts, and said relative position is such that said coupling is realized when at least one lateral edge of each of said tongue like elements abuts an edge of a repective cut-out part. Thus, the second and third positioning means can be realized in an easy way, especially when the plate is a thin metal plate, e.g. made of nickel and when the tongue shaped elements and the cut-out parts are provided on such a plate.

Still another characteristic feature of the invention is that said optical device comprises at least one other optical fiber conductor forming part of said optical coupling structure. Coupling between the optical fiber conductors is then realized by inverting one of the coupling structures, bringing it on top of the other coupling structure and sliding it over that other structure until the upstanding tongues on one structure abut corresponding edges of the cut-out parts of the other structure.

The invention also relates to a method for realizing an optical coupling structure according to one of the above embodiments.

The invention thus also relates to a method of realizing an optical coupling structure for coupling an optical termination of an optical fiber conductor to an optical terminal of an optical device, said method including the steps of:

laterally cutting a substantially V-shaped portion out of a plate, said V-shaped cut-out portion being such that an end part of said optical fiber conductor can fit in it;

realizing on said plate first positioning means at a predetermined location with respect to said V-shaped cut-out part;

applying said plate on a submount;

arranging said optical fiber conductor on said submount in such a way that a bent end part of said optical fiber rests on the edges of the V-part of said V-shaped cut-out portion and protrudes from the surface of said plate, said bent part of said optical fiber conductor thereby being accurately positioned;

fixing said optical fiber conductor to said submount;

polishing away the part of said bent part of said optical fiber conductor protruding from said surface of said plate, thereby forming said optical termination, said coupling being realized by the cooperation of said first positioning means with second positioning means realized on a carrier on which said optical device is mounted.

Additionally, in order to realize said polishing, said method includes the steps of realizing at least two protruding elements on said plate, said protruding elements being located at the same side as said protruding part of said optical fiber conductor and on both sides of said optical fiber conductor, simultaneously polishing the protruding part of said optical fiber conductor and said protruding elements and mutually aligning a polishing device used for said polishing and said optical fiber conductor using said polished protruding elements.

The invention also relates to a positioning means for positioning an end part of a conductor arranged on a carrier with respect to said carrier, such as the one used in the optical coupling structure according to the invention, i.e. which comprises a plate to be applied to a surface of said carrier and having a substantially V-shaped lateral cut-out portion which has such dimensions and is to be so applied on said carrier as to enable said end part of said conductor when bent away from said surface to rest on the edges of the V part of said cut-out part.

BRIEF DESCRIPTION OF THE DRAWINGS

The above mentioned and other objects and features of the invention will become more apparent and the invention itself will be best understood by referring to the following description of an embodiment taken in conjunction with the accompanying drawings wherein.

The dashed lines in the figures indicate hidden parts which have been shown for the sake of clarity.

DETAILED DESCRIPTION

Figure 1A:
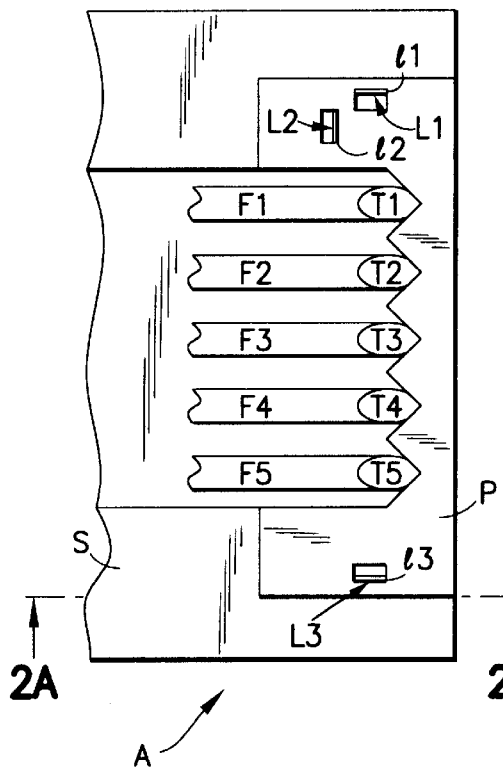
FIGS. 1A and 1B represent respective two complementary coupling structures A and B according to the invention, A being a top view and B being a bottom view of the respective structures.
Figure 2A:
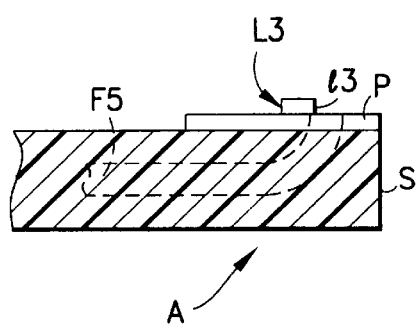
FIGS. 2A and 2B are cross-sectional views of the structures of FIGS. 1A and 1B taken along lines 2A—2A and 2B—2B, respectively.

The coupling structure A of FIGS. 1A and 2A comprise a plastic support S having the form of a plastic cube out of which a portion has been removed to obtain an U-shaped platform and a slope between the legs of the U-shaped platform is inclined toward the base thereof. A nickel plate P is mounted on the platform. The plate P is 0.3–0.5 mm thick and has a U form with lateral V-shaped cut-out portions in the base of the U which are realized with an accuracy of 1 micrometer over a length of 10 cm. Optical terminations T1–T5 of 5 optical fiber conductors F1–F5 fit in the V part of the V-shaped cut-out portions of the plate P. The fiber conductors are positioned on the slope of the plastic support.

Three upstanding rectangular tongue shaped elements L1–L3 are realized on the plate at predetermined positions which are such that they can cooperate with respective positioning means of the structure B of FIGS. 1B and 2B as will be explained later.

It is to be noted that the solid dark areas 11, 12 and 13 of FIG. 1A indicate those parts coming out of the plane of the structure.

Figure 1B:
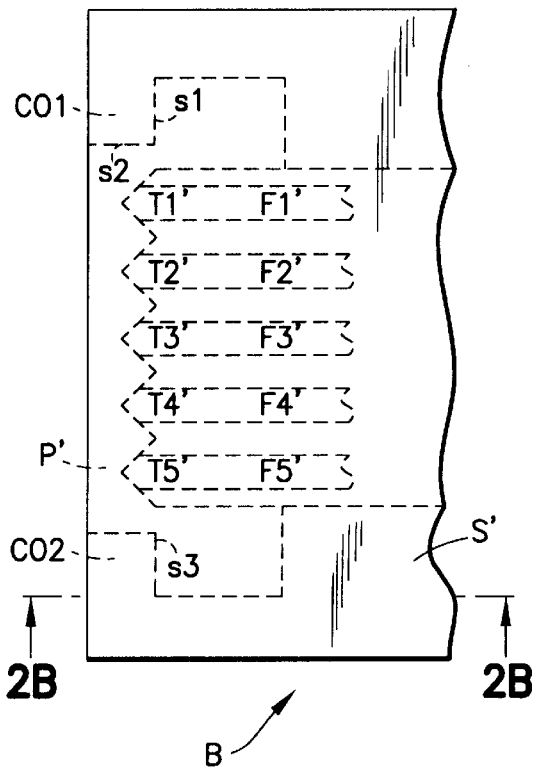
Figure 2B:
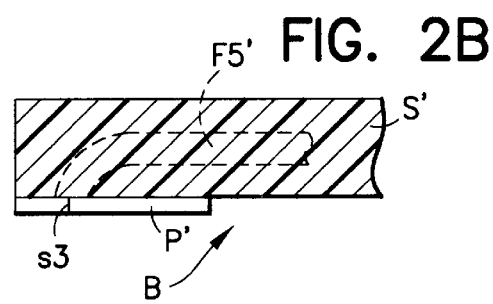

The structure B shown in FIGS. 1B and 2B likewise comprises a plastic support S' similar to S with mounted thereon a nickel plate P' similar to P, 5 optical fiber conductors F1'–F5' being positioned on the support S' and having optical terminations T1'–T5' which fit in the V-shaped cut-out portions of P'.

Instead of tongue shaped elements, the plate has two rectangular cut-out parts CO1 and CO2 at the corners of the plate, near the fiber terminations.

The tongue shaped elements of A and the rectangular cut-out parts of B are so located and so dimensioned that when sliding A over B, or vice versa, until for each of the tongue shaped elements L1–L3 a side l1–l3 thereof abuts a corresponding edge s1–s3 of the respective cut-out part CO1 and CO2, i.e., as can be seen on FIGS. 1A and 1B, l1 abuts s1, l2 s2 and l3 s3, a contact is realized between the optical terminations T1–T3 and T1'–T3' respectively. In order to improve the latter contact an index matching material such as an oil, a gel or a foil with matching refractive index is applied on the optical terminations.

It is to be noted that the heigth of the tongue shaped elements can be either equal to the thickness of the plates or greater than that thickness provided that part of the plastic support under the rectangular cut-out parts is then also removed.

It also is to be noted that the positioning of the tongue shaped elements can be such that there is no need for cut-out parts, but that the edges of P' can be used to realize correct contact between the optical terminations.

Following is a description of how the above coupling structures A and B are realized.

First the fibers F1–F5/F1'–F5' are positioned on the slope of a plastic support S/S' so that ends of the fibers are slightly bent upwards to form an angle with the surface of the plastic support. Then the nickel plates P/P' with the V-shaped cut-out parts are fixed on the platform of the the support using a glue. They are so positioned that the bent edges of the fiber conductors rest on the edges of the respective V-shaped cut-out parts. An embedding layer (not shown), e.g. made of an epoxy resin, fixes the fiber conductors to the plastic support. The part of the fiber conductors protruding from the surface of the plates is polished away using a polishing tool. Before polishing, protruding elements having for instance a triangular form are applied in cut-out recesses (both not shown) of the plate on both sides of the fiber conductors, a top of the triangles protruding from the plate so that the triangles are polished together with the fiber conductors. Allignment of the polishing tool and the fiber terminations is realized by assuring parallellism of the polishing tool and the polished protruding elements, e.g. using a video camera with simple pattern recognition. Errors in parallelism are corrected by 2 computer-driven rotation stages (not shown).

It is to be noted that instead of applying protruding elements the edges of the nickel plate could be bent upwards towards the fiber terminations to form the protruding elements.

The tongue shaped elements as well as the V-shaped cut-out parts, the triangular elements and the cut-out grooves are realized by means of the LIGA technique. This technique is well known and is for instance described in the course material provided by the "Institut für Microtechnik Mainz" for their course "LIGA technique".

The above described coupling structures are not restricted to the realization of coupling of fiber conductors. Indeed, one of the structures can for instance, instead of optical fiber conductors, carry an active electro-optical component such as a laser diode, positioned on the plastic submount.

While the principles of the invention have been described above in connection with specific apparatus, it is to be clearly understood that this description is made only by way of example and not as a limitation on the scope of the invention.

We claim:

1. An optical coupling structure for coupling an optical termination (T1–T5) of an optical fiber conductor (F1–F5) to an optical terminal (T1'–T5') of an optical device (F1'–F5'), said optical coupling structure comprising:

a first carrier (S, P) in which the optical fiber conductor is embedded so as to have at least one locally bent portion reaching an outer surface of said carrier and forming at said outer surface said optical termination, said first carrier including a first positioning means (P) to correctly position said optical termination with respect to said first carrier and a second positioning means (L1–L3) that cooperates with a third positioning means (s1, s2, s3) of the optical coupling structure including the optical device to couple the optical termination (T1–T5) to the optical fiber conductor; and wherein said first positioning means (P) comprises a plate having a substantially V-shaped lateral cut-out portion for receiving said optical termination (T1–T5) therein.

2. The optical coupling structure according to claim 1, wherein:

said optical arrangement includes a second carrier (S', P') on which said optical device is mounted; and said cooperating second and third positioning means comprise cooperating upstanding tongue shaped elements (L1–L3) and predetermined edges (s1, s2, s3) of said first (S,P) and second (S', P') carriers;

said tongue shaped elements and said predetermined edges being so positioned that coupling can be realized by mutually bringing the lateral edges of said tongue shaped elements and respective ones of said predetermined edges into a predetermined relative position with respect to each other.

3. The optical coupling structure according to claim 2, wherein:

said upstanding tongue shaped structures (L1–L3) are respectively rectangular in a shape thereof and said relative position is such that said coupling is provided when at least one lateral edge of each of said tongue shaped structures abuts a respective predetermined edge.

4. The optical coupling structure according to claim 3, wherein said predetermined edges (s1, s2, s3) are edges of cut-out parts (CO1, CO2) of a respective one of said carriers (P, S').

5. The optical coupling structure according to claim 4, wherein said cut-out parts (CO1, CO2) are respectively rectangular in a shape thereof.

6. The optical coupling structure according to claim 2, wherein said optical device comprises at least one other optical fiber conductor (F1'/F5') that forms part of said optical coupling structure.

7. The optical coupling structure according to claim 6, wherein said plate is a metal plate and said tongue shaped elements and said predetermined edges are realized on said plate.

8. The optical coupling structure according to claim 2 wherein said predetermined edges (s1, s2, s3) are edges of cut-out parts (CO1, CO2) of a respective one (P', S') of said carriers.

9. The optical coupling structure according to claim 8, wherein said cut-out parts (CO1, CO2) are rectangular.

10. A positioning means for positioning an end part of a conductor arranged on a first carrier with respect to a second carrier, wherein the positioning means comprises plates to be applied to a surface of said carriers, said plates having a substantially V-shaped lateral cut-out part which is dimensioned so that when the cut-out part is applied on said carriers, said end part of said conductor is bendable away from said surface to rest on edges of the V-shaped lateral cut-out part.

11. A method of providing an optical coupling structure for coupling an optical termination (T1–T5; T1'–T5') of an optical fiber conductor (F1–F5; F1'–F5') to an optical terminal (T1'–T5'; T1–T5) of an optical device (F1'–F5'; F1–F5), said method including the steps of:

forming first positioning means by laterally cutting a substantially V-shaped portion out of a plate (P,P'), said V-shaped cut-out portion being such that an end part of said optical fiber conductor can fit therein;

providing on said plate, second positioning means (L1–L3) that cooperates with a third positioning means (s1, s2, s3) of the optical coupling structure including the optical device to couple the optical termination (T1–T5) to the optical fiber conductor, the second positioning means (L1–L3) being provided at a predetermined location with respect to said V-shaped cut-out portion;

applying said plate (P, P') on a submount (S, S');

arranging said optical fiber conductor on said submount so that a bent end part of said optical fiber rests on edges of a V-part of said V-shaped cut-out portion and protrudes from a surface of said plate (P, P'), said bent part of said optical fiber conductor thereby being accurately positioned;

fixing said optical fiber conductor to said submount; and polishing away at least a part of said bent part of said optical fiber conductor protruding from said surface of said plate, thereby forming said optical termination;

and wherein:

said coupling is formed by a cooperation of said first positioning means with said second positioning means (L1–L3) and said third positioning means (s1, s2, s3) is formed on a carrier on which said optical device is mounted.

12. The method according to claim 11, wherein said cooperating second and third positioning means respectively comprise cooperating upstanding tongue shaped elements (L1–L3) and predetermined edges (s1, s2, s3) of said plate and said carrier, said tongue shaped elements and said predetermined edges being so positioned that coupling can be realized by mutually bringing the lateral edges of said tongue shaped elements and respective ones of said predetermined edges to a predetermined relative position with respect to each other.

13. The method according to claim 11, wherein said polishing step comprises the steps of forming at least two protruding elements on said plate, said protruding elements being located at a same side as said protruding part of said optical fiber conductor and on both sides of said optical fiber conductor, simultaneously polishing the protruding part of said optical fiber conductor and said protruding elements and mutually aligning a polishing device used for said polishing and said optical fiber conductor using said polished protruding elements.

14. The method according to claim 11, wherein said optical device comprises another optical fiber conductor forming part of said optical coupling structure and an index matching material is applied on at least one of the optical terminations of the to be coupled optical fiber conductors prior to realizing said coupling.

* * * * *